United States Patent [19]

Kaye

[11] 4,238,101
[45] Dec. 9, 1980

[54] SUPPORT STAND FOR HIGH FIDELITY SPEAKER

[76] Inventor: Steven W. Kaye, 275 Prospect St., East Orange, N.J. 07017

[21] Appl. No.: 26,924

[22] Filed: Apr. 4, 1979

[51] Int. Cl.³ .......................................... F16M 13/00
[52] U.S. Cl. ............................... 248/441 R; 248/152; 248/174; 248/346
[58] Field of Search ............ 248/148, 152, 174, 188.1, 248/188.6, 346, 441 R, 459

[56] References Cited

U.S. PATENT DOCUMENTS

| | | | |
|---|---|---|---|
| 582,333 | 5/1897 | Wright | 248/459 |
| 591,089 | 10/1897 | Berbecker | 248/459 |
| 1,120,239 | 12/1914 | Prigge | 248/459 |
| 1,666,400 | 4/1928 | Rose | 248/459 |
| 3,913,877 | 10/1975 | Wiener | 248/188.1 X |
| 4,073,460 | 2/1978 | Dale | 248/441 R |

*Primary Examiner*—William H. Schultz
*Attorney, Agent, or Firm*—Henry R. Lerner

[57] ABSTRACT

A support stand for a high fidelity speaker which comprises a pair of vertical side panels converging toward each other at their front ends where they are connected to each other. The bottom edges of the side panels lie in a horizontal plane which defines the resting surface for the support stand. The upper edges of the side panels are inclined downwardly from front to rear so as to lie in a downwardly and rearwardly slanted plane which defines a rearwardly inclined supporting surface, for the speaker, which is raised above the resting surface for the stand. The upper edges terminate at their rear ends in upstanding edges which define stops for the speaker which is supported on the supporting surface of the stand.

6 Claims, 8 Drawing Figures

U.S. Patent     Dec. 9, 1980     4,238,101
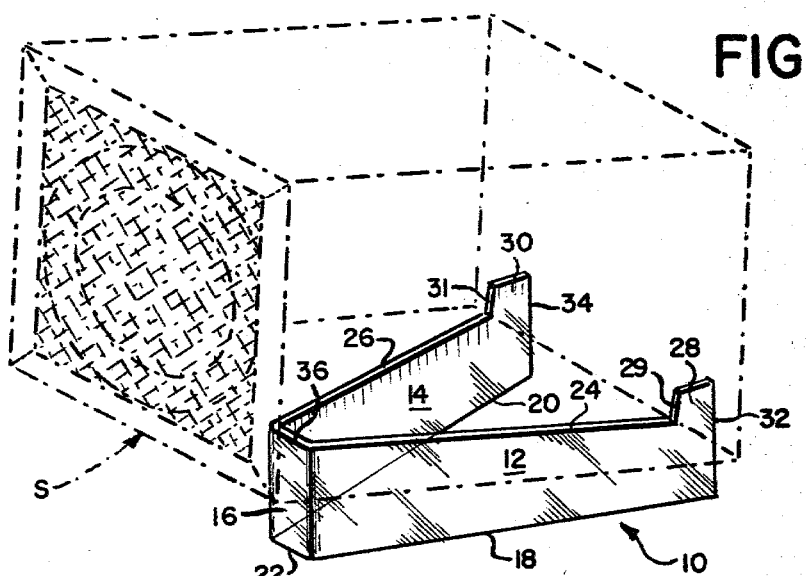
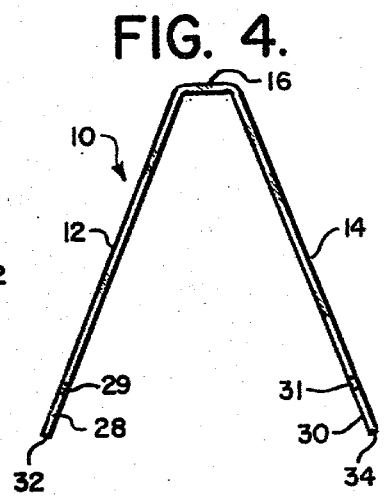
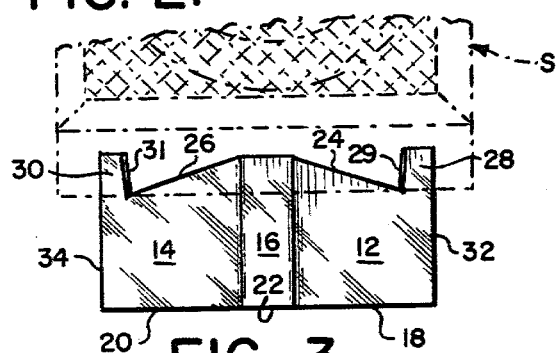
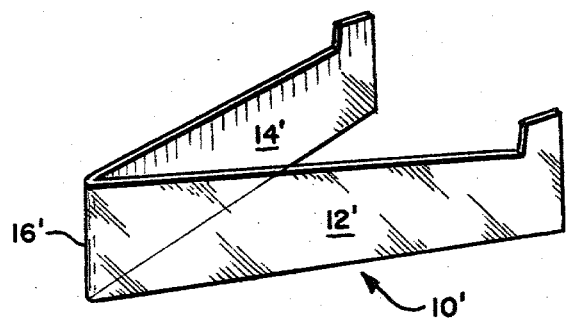
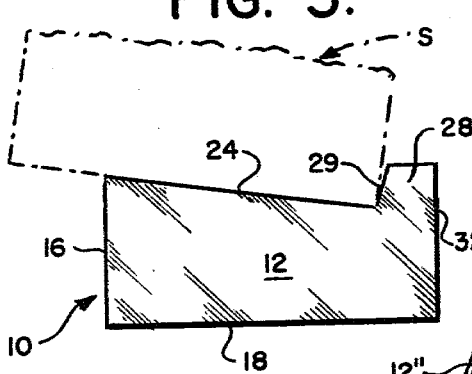
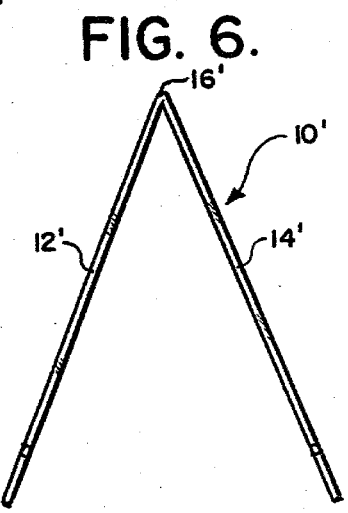
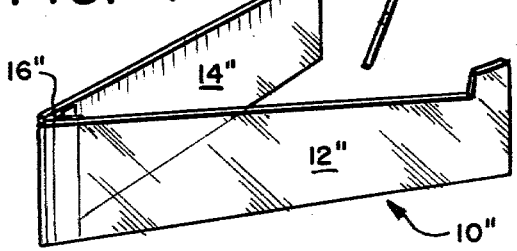

SUPPORT STAND FOR HIGH FIDELITY SPEAKER

BACKGROUND OF THE INVENTION

This invention relates to support stands for speakers, particularly high fidelity stereo speakers.

In recent years there has been a tremendous growth in the development of sophisticated high fidelity components creating a demand, in turn, for devices for supporting these high fidelity components in a manner which permits these components to function at peak efficiency. In this connection, it is known that for a high fidelity speaker to perform optimally, it is highly desirable to have the speaker supported in raised relation with respect to the floor, and slanted downwardly, from front to rear. Such orientation of the speaker provides for better dispersion of the sound emanating from the speaker into the listening area and also provides the proper acoustic coupling to prevent vibration from the speaker from being transmitted through the floor, to other components.

The prior art is replete with speaker stands having all kinds of configurations which purport to meet the aforementioned objectives. Yet such prior art speakers lack the simplicity and economy of construction whereby they are still undesirable and short of performing their intended function with optimum efficiency.

It is an object of the invention to provide a supporting stand for a high fidelity speaker which incorporates therein all th requisite advantages of the prior art, as well as additional advantages, while having an improved construction rendering the same far more economical than those of the prior art.

It is another object of the present invention to provide a support stand for a high fidelity speaker which includes forwardly converging side panels for better dispersion of sound waves emanating from the speaker which impinge upon said converging side walls.

It is yet another object of the invention to provide a stand for a high fidelity speaker which is of a one-piece construction and which is substantially light-weight and which is capable of stably supporting a high fidelity speaker of substantially any size.

SUMMARY OF THE INVENTION

In accordance with the invention, the support stand comprises a one-piece member having a pair of side walls converging toward each other and joined at their front ends in a transverse vertical panel. The bottom edges of the converging side panels are co-planar with the bottom edge of the front transverse panel to define a horizontal plane which is the plane on which the stand is supported by the floor, or shelf, as the case may be. The upper edges of the side panels are slanted downwardly from front to rear and terminate in upstanding edges, forming part of the rear ends of the side panels. Thus the upper edges of the side panels and the top edge of the front panel define an oblique plane i.e., slanted downwardly from front to rear, which plane defines the supporting surface for the speaker proper. Since the speaker proper usually consists of a box-like member, when it rests on its supporting plane, such speaker will be angled upwardly, in the direction of sound emission. The upstanding edges at the rear of the side panels define stops which engage the rear wall of the speaker enclosure so as to firmly and stably maintain the speaker in position.

The above construction enables the supporting stand to support a speaker of substantially any size since the width of the speaker enclosure can vary from the magnitude slightly greater than the distance between the rear ends of the side panels to a substantially greater magnitude. Similarly, the depth of the speaker can extend up to an amount equal to nearly two times the length of the side panels.

Further in accordance with the above construction, there is a greater dispersion of sound waves since the use of the converging side panels more widely spread the sound waves which impinge said side walls than would be the case, as in prior art speaker stands, where the side walls lie in planes which are parallel to the side walls of the speaker enclosure.

In accordance with another embodiment of the invention, the two converging side walls are joined directly to each other at their front ends defining at such juncture a single vertex, instead of the transverse panel of the earlier described embodiment. This embodiment, however, has substantially the same structural and acoustical characteristics as described in connection with the earlier embodiment.

BRIEF DESCRIPTION OF THE DRAWINGS

FIG. 1 is a side perspective view of a speaker stand in accordance with the preferred embodiment of the invention;

FIG. 2 is a front elevational view thereof;

FIG. 3 is a side elevational view thereof;

FIG. 4 is a top plan view thereof;

FIG. 5 is a side perspective view of another embodiment of a speaker stand in accordance with the invention;

FIG. 6 is a top plan view thereof;

FIG. 7 is a side perspective view of yet another embodiment of the invention; and FIG. 8 is a top plan view thereof.

DESCRIPTION OF THE PREFERRED EMBODIMENTS

Referring now to the drawings, FIGS. 1 through 4 illustrate the preferred embodiment, identified by the reference 10, of a support stand for a speaker in accordance with the present invention.

Speaker stand 10 comprises a pair of vertical side panels 12 and 14 converging toward each other at their forward ends at which they are joined by a transverse vertical panel 16. Lower edges 18 and 20 of panels 12 and 14, respectively, together with lower edges 22 of front panel 16 lie in a horizontal plane to define a flush supporting surface for stand 10. Upper edges 24 and 26 of vertical panels 12 and 14, respectively, are slanted downwardly, from front to rear, and the panels terminate at the rear into end sections 28 and 30, bounded by front edges 29 and 31 and rear edges 32 and 34.

The speaker stand 10 is made of one piece either by molding the same in said one piece or by conventional bending operation. The material used for speaker stand 10 is conventional lucite which may either be transparent or partially opaque and whose thickness is approximately one-quarter of an inch.

The above described construction for speaker stand 10 permits the same to stably support a speaker thereon. In this connection, it should be noted that upper edges 24 and 26 together with upper edges 36 of front panel 16 lie in a common plane which is inclined downwardly from front to rear, which plane defines the supporting surface for a speaker S. In view of the rearward and downward slant of such plane, the speaker S supported on said plane is gravitationally urged rearwardly, but is maintained in fixed position on the stand by engagement of upstanding front edges 29 and 31 with the rear of speaker S, such upstanding edges defining stops for the speaker, and such edges being substantially normal to upper edges 24 and 26, respectively.

The included angle between side panels 14 and 12 preferably lies in a range between 30° and 60°. Such angularity of the side panels promotes the greater dispersion of sound waves emanating from the speaker which impinge said side panels. It will be apparent from the drawings that the speaker enclosure supported by support stand 10 can vary significantly in size. More specifically, the width dimension of the speaker enclosure can vary from a magnitude slightly greater than the distance between edges 29 and 31, to a substantially greater magnitude. Further, since the speaker enclosure is gravitationally urged into engagement with stops 29 and 31, the depth thereof can be such as to permit the speaker to significantly project forwardly beyond front panel 16.

The one-piece speaker stand construction 10 illustrated in FIGS. 1 through 4 can thus be seen to perform all of its intended functions in a superior way, while still maintaining such simplicity of construction to render the same uniquely economical, in a manner heretofore unknown in the prior art.

Referring now to FIGS. 5 and 6, there is shown another embodiment 10' in accordance with the invention. This embodiment includes converging side panels 12' and 14' which are substantially identical in construction to panels 12 and 14 of the embodiments of FIGS. 1 and 4. The only difference resides in having the front edges of these panels joined directly to each other at vertex 16' rather than joined to opposite sides of front panel 16. In all other respects, the support stand 10' functions in the same manner as previously described stand 10 and thus incorporates substantially all of the improvements and advantages thereof.

Referring now to FIGS. 7 and 8, there is shown yet another embodiment 10" of a support stand in accordance with the invention. Speaker stand 10" includes converging side panels 12" and 14", identical in construction to panels 12 and 14 of embodiment 10 and panels 12' and 14' of embodiment 10'. In embodiment 10", however, panels 12" and 14" are separate components which are joined at their front edges by a hinge 16". This enables the included angle between panels 12" and 14" to be adjusted, as desired, and impart some measure of flexibility to the unit. It will be understood that hinge 16" can be of the type which would be locked in position to maintain the preselected included angle constant. In all other respects, support stand 10" incorporates the highly improved features previously described in connection with support stand 10 and support stand 10'. Thus it is seen that each of the embodiments in accordance with the invention is of simple and economical construction and fully performs, in optimal fashion, the improved functions hereabove described.

While there is herein shown and described the preferred embodiments of the invention, it will be understood that the invention may be embodied otherwise than as herein specifically illustrated or described, and that in the illustrated embodiments certain changes in the details of construction and in the form and arrangement of parts may be made without departing from the underlying idea or principles of this invention within the scope of the appended claims.

Having thus described my invention, what I claim and desire to secure by Letters Patent is:

1. A support stand for a high fidelity speaker comprising,
   (a) a pair of vertical side panels converging toward each other at their front ends,
   (b) means connecting said front ends of said side panels to each other,
   (c) the bottom edges of said side panels lying in a horizontal plane which defines the resting surface for said stand,
   (d) the upper edges of said side panels being inclined downwardly from front to rear whereby to lie in a downwardly and rearwardly slanted plane which defines a rearwardly inclined supporting surface for said speaker which is raised above the resting surface for said stand,
   (e) said upper edges terminating at their rear ends in upstanding edges to define stops for a speaker supported on said supporting surface.

2. A support stand in accordance with claim 1, wherein said connecting means comprise a vertical front panel whose opposite side edges are connected, respectively, to the front ends of said side panels.

3. A support stand in accordance with claim 1, wherein said connecting means comprises a vertex directly securing the front ends of said side panels to each other.

4. A support stand in accordance with claim 1, wherein said connecting means comprises hinge means connected to said front ends of said side panels for adjustably varying the included angle between said side panels.

5. A support stand in accordance with claim 2 or 3, wherein stand is made of a one-piece lucite construction.

6. A support stand in accordance with claim 2 or 3, wherein the included angle between the side panels lies in the range between 30° and 60°.

* * * * *